United States Patent Office 2,996,271
Patented Aug. 15, 1961

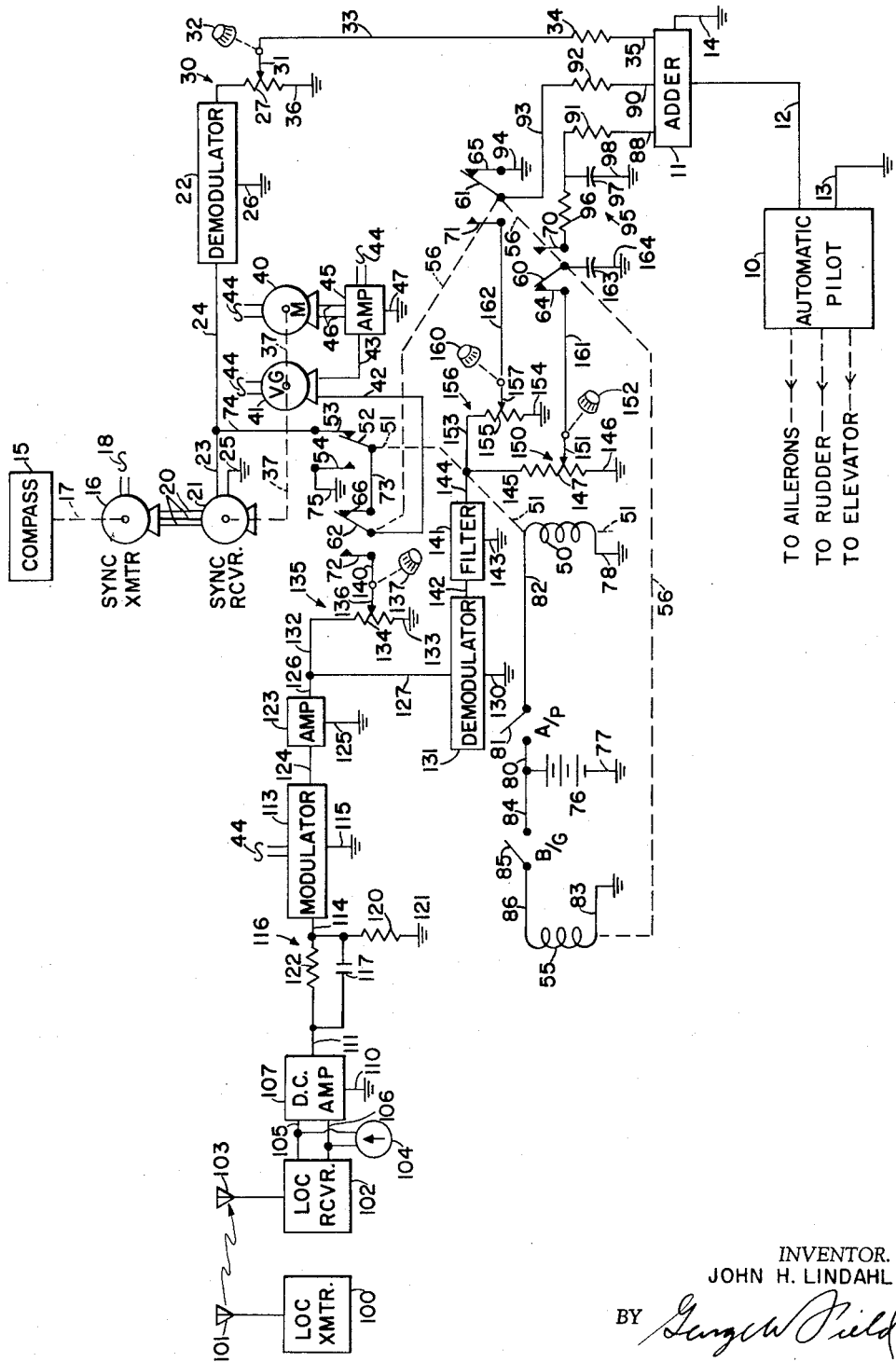

2,996,271
AIRCRAFT APPROACH COUPLER
John H. Lindahl, Florissant, Mo., assignor to Minneapolis-Honeywell Regulator Company, Minneapolis, Minn., a corporation of Delaware
Filed Feb. 21, 1958, Ser. No. 716,689
9 Claims. (Cl. 244—77)

This invention relates to the field of aviation electronics, and more particularly to approach couplers for interconnecting an automatic pilot and a localizer or an omnirange receiver. A principal object of the invention is to provide an improved approach coupler which by reason of increased rapidity of action is able to bring fast moving aircraft on to the radio beam in the relatively short interval available for such an aircraft.

Various other objects, advantages and features of novelty not particularly enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic diagram of an approach coupler according to the invention, and includes by way of illustration a localizer transmitter and receiver.

In the figure there is shown an automatic pilot 10 for controlling the ailerons, rudder, and elevators of an aircraft to stabilize its attitude about roll, yaw and pitch axes. It is of course understood that such an automatic pilot includes condition sensing components such as gyroscopes, control surface position sensors, and accelerometers, as well as control surface servomotors and incidental centering, trim, authority and similar adjusting devices. The arrangement may be hydraulic, pneumatic, electrical, or any combination thereof: such automatic pilots are known in the art, and it is also known that additional external signals may be supplied to further control the aircraft in accordance with compass heading, for example. In the figure there is shown an adder 11 which supplies an electrical signal to automatic pilot 10 through a conductor 12 and ground connections 13 and 14. Automatic pilot 10 may conveniently be of the type shown in the copending application of Corles M. Perkins, Serial No. 553,131, filed December 14, 1955, and assigned to the assignee of the present application, where direct current electrical signals are used.

To give compass control of the automatic pilot, a compass 15 is shown in the upper central portion of the figure as positioning a selsyn transmitter 16 through a mechanical connection 17. Transmitter 16 is located at the compass, and is energized from a source 18 of alternating voltage of suitable frequency. It is connected by conductors 20 to a remote selsyn receiver 21, the output of which is supplied to a demodulator 22 through conductors 23 and 24 and ground connections 25 and 26. The direct voltage output from demodulator 22 is impressed across the winding 27 of a gain control voltage divider 30 having a slider 31 adjustable by a manual knob 32. Slider 31 is connected to adder 11 through conductor 33, a summing resistor 34, and conductor 35, and through ground connections 14 and 26.

Selsyn receiver 21 is positioned by the shaft 37 of a motor 40 which also drives a velocity generator or dynamic transformer 41, the latter operating to supply on conductors 42 and 43 an alternating voltage determined in amplitude by the speed at which the motor operates, and in phase by the direction of motor rotation. The generator is energized from a source 44 of alternating voltage which may be different from source 18. Motor 40 is energized from source 44 under the control of a motor control amplifier and discriminator 45 which is also energized from source 44, and which is connected to motor 40 by conductors 46. The input to amplifier 45 is supplied on conductor 43 and ground connection 47, and is determined by an autopilot relay having a winding 50 which actuates an armature 51 to displace a movable contact 52 out of normal engagement with a first fixed contact 53 and into engagement with a second fixed contact 54, and a beam guidance relay having a winding 55 which actuates an armature 56 to displace movable contacts 60, 61 and 62 out of normal engagement with first fixed contacts 64, 65, and 66 and into engagement with second fixed contacts 70, 71, and 72 all respectively. The relay contacts are shown in the position they assume when the windings are de-energized. Conductor 42 is connected to movable contact 62. Fixed contact 66 is connected to movable contact 52 by conductor 73. Fixed contact 53 is connected to selsyn receiver 21 by conductors 74 and 23. Fixed contact 54 is grounded at 75.

Relay winding 50 is energized from a suitable source 76 of electrical energy, shown as a battery, through ground connections 77 and 78 and through conductor 80, a manual autopilot engage switch 81 and conductor 82. Relay 55 is energized from source 75 through ground connections 77 and 83 and through conductor 84, a manual beam guidance switch 85, and conductor 86.

Two further connections are made to adder 11 through conductors 88 and 90 and summing resistors 91 and 92. The latter is normally grounded through conductor 93, normally closed relay contacts 61 and 65, and ground connection 94. Normally open relay contact 70 is connected to resistor 91 through a resistance capacitance delay network 95 including resistor 96 and capacitor 97 grounded at 98. Network 95 will be identified as the "transient bracketing network."

The apparatus may also be used to control the craft in accordance with a radio beam such as that from the omni directional range or ILS localizer beams. The latter is illustrated in the figure, which shows a localizer transmitter 100 having an antenna 101, and a localizer receiver 102 having an antenna 103 and energizing the vertical needle of a cross pointer indicator 104. The receiver output is also supplied on conductors 105 and 106 to a D.C. amplifier 107 which supplies between ground connection 110 and conductor 111 a direct voltage determined by the lateral displacement of the aircraft from the center of the localizer beam. Amplifier 107 is connected to a modulator 113, having input conductor 114 and a ground connection 115, by a resistance capacitance network 116 including a capacitor 117, a resistor 120 grounded at 121, and a further resistor 122. Network 116 is a rate insertion network, the voltage across resistor 120 being determined in part by the rate of change of the amplifier output magnitude and in part by the magnitude itself.

Modulator 113 is energized from source 44: its output is supplied to an amplifier 123 through conductor 124 and ground connections 125 and 115. The output of amplifier 123 is supplied through conductors 126 and 127 and ground connections 130 and 125 to a demodulator 131, and through conductors 126 and 132 and ground connections 133 and 125 to the winding 134 of a gain control voltage divider 135 having a slider 136 adjustable by a manual knob 137 and connected to relay contact 72 by conductor 140.

The output of demodulator 131 is supplied to a filter 141 through conductor 142 and ground connections 143 and 130. The output of filter 141 is supplied through conductors 144 and 145 and ground connections 146 and 143 to the winding 147 of a gain control voltage divider 150 having a slider 151 adjustable by a manual knob 152, and through conductors 144 and 153 and ground connections 154 and 143 to the winding 155 of a gain control voltage divider 156 having a slider 157 adjustable by a manual knob 160. Slider 151 is connected to relay contact 64 by conductor 161. Slider 157 is connected to relay contact 71 by conductor 162. An energy storage device, shown as capacitor 163, is connected to movable relay contact 60 and ground connection 164.

Operation

It will be evident that before the automatic pilot is engaged the output of receiver 21 is supplied to amplifier 45 through conductors 23 and 74, normally closed relay contacts 53 and 52, conductor 73, normal enclosed relay contacts 66 and 62, conductor 42, velocity generator 41, and conductor 43, the circuit being completed through ground connections 47 and 25. Motor 40 is energized by amplifier 45 and adjusts receiver 21 through mechanical connection 37 to reduce the receiver output to zero. Thus the selsyn receiver is "synchronized" with the compass transmitter, and no signal is supplied to adder 11 to influence the automatic pilot regardless of changes in the heading of the aircraft. During this operation the velocity generator output serves as an antihunt signal to stabilize motor operation and prevent overshoot.

When automatic pilot operation is desired, switch 81 is closed to energize relay winding 50. These components are normally parts of automatic pilot 10 and perform the usual functions there, as indicated by the downward extension of mechanical connection 51. In addition movable contact 52 disengages fixed contact 53 and engages fixed contact 54, thus grounding the input to amplifier 45. Motor 40 is now inoperative, and any change in heading of the aircraft results in a signal from selsyn receiver 21 which is not wiped out by the motor, but is transmitted through demodulator 22, gain adjusting control 30, and adder 11 to automatic pilot 10, to adjust the latter so that the craft returns to the previous heading.

Beam guidance is never attempted until the automatic pilot is in operation, so that switch 81 is closed and relay 50 is operated, nor until the aircraft is close enough to the beam so that the cross pointer needle has moved from its central position to the stop at one extremity or at one extreme of its travel, and is beginning to move back towards center again. At this time the direction of displacement of the needle from the central zero position indicates the direction of displacement of the aircraft from beam center, and the magnitude of the displacement represents the magnitude of the aircraft displacement from the beam. The voltage from the localizer receiver is amplified in amplifier 107 and appears between conductor 111 and ground. The rate of change of the voltage is taken in network 116, so that the input to modulator 113 is a direct voltage representative of the displacement of the aircraft from beam center and the rate of movement of the aircraft with respect to beam center. The modulator output is amplified and applied through gain control 135 to relay contact 72, which however is at present disengaged. The modulator output is also demodulated in unit 131, filtered in filter 141, and supplied through gain controls 150 and 156 to relay contacts 64 and 71. The latter contact is disengaged, but the former contact engages movable contact 60, and capacitor 163 is thus charged to and maintained at a potential determined by the displacement and the rate of approach of the aircraft relative to the beam.

When beam guidance is desired, switch 85 is closed, energizing relay winding 55. Relay contacts 60, 64 and 70 isolate capacitor 163 from gain control 150 and connect the capacitor to adder 11 through network 95 and summing resistor 91. Relay contacts 61, 65 and 71 unground summing resistor 92 and connect it to receive the output of gain control 156, which has elements of both rate and displacement. Relay contacts 62, 66 and 72 unground conductor 42 and connect it to the output of gain control 135, which also has elements proportional to rate and displacement. Motor 40 is now energized and operates, as long as a signal is present on slider 136, at a rate such that the output of velocity generator 41 balances the signal on the slider, adjusting the receiver 21 so that it supplies a voltage through demodulator 22, gain control 30, and summing resistor 34 to adder 11. Since motor 40 runs as long as there is a signal, and at a rate determined by the signal, the selsyn output is an integral function of the signal itself. This operation is described in the copending Perkins application referred to above.

Closure of the beam guidance switch thus supplies to adder 11 two steady state signals, determined by the output of amplifier 123 in its time integral, and a transient or decremental signal, determined by the displacement and rate of movement of the aircraft relative to beam center at the moment when the switch was closed. The provision of this signal greatly improves the operation of the system, as will now be explained.

The bracketing interval remaining before an aircraft approaching a beam at a predetermined airspeed passes completely across the linear control portion of the beam is proportional to the angle of approach. In other words, the larger the angle of approach of the aircraft to the beam, the shorter is the interval during which the automatic equipment in the aircraft can operate to bring the aircraft on to the beam. In commercial aircraft heretofore the airspeed has been such that an interval of useful length was available, but with the advent of jet propelled aircraft airspeeds have begun to reach values which result in dangerously short bracketing intervals.

The beam guidance signal must be determined by the position of the aircraft, and the rate of approach of the aircraft to the beam. The non-linearities of the ILS beam and the required lead network 116 severely limit the usable gain. This gain can be greatly increased during the initial bracketing by sensing the coupler output and storing this information in the form of an electrical charge on a capacitor. Such a signal is added by capacitor 163 and summing resistor 91, and decays or is subject to decrement at a rate determined by the time constant of network 95. The initial voltage to which the capacitor is charged is sufficient to cause an initial turn of the aircraft toward the beam which provides a much larger effective gain than could be tolerated throughout the whole instrument approach. The time constant of transient bracketing network 95 is such that it gives essentially no signal after the initial bracketing turn of the aircraft. Moreover, since the capacitor 163 is charged to a voltage determined by the rate of movement of the aircraft relative to the beam in addition to the aircraft displacement from the beam center, the decremental signal is larger for more speedy aircraft or higher approach rates on the same aircraft, where its effect is most needed.

From the foregoing specification it will be evident that I have invented means for improving the beam guidance equipment to make it useable with aircraft having very high airspeeds, by adding to the steady state beam guidance signals a decremental bracketing signal which is unaffected by beam non-linearities during the bracketing and approach operation of the coupler, and that I have done this without materially increasing the weight or complexity of the system.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. In combination: means giving an output determined by the lateral displacement of a craft from a predetermined course; means giving a first signal determined by said output; means giving a second signal representative of the time integral of said output; means giving a decremental signal determined initially by the rate of change of said output; and means combining said first, second and third signals to give a control output determined jointly thereby.

2. In combination: means giving an output determined by the lateral displacement of a craft from a predetermined course; means giving a first signal determined by said output; means giving a second signal representative of the time integral of said output; means giving a decremental signal determined initially by the rate of change of said output; and means controlling the craft in accordance with the joint effect of said first, second and third signals.

3. In combination: means for giving a control output in accordance with the time varying lateral displacement of a craft from a predetermined course and by the time integral of said displacement; means for supplying a decremental signal determined initially by the rate of change of said displacement; and means modifying said control output in accordance with said decremental signal.

4. In combination: means for controlling craft laterally in accordance with the time varying lateral displacement of the craft from a predetermined course and with the time integral of said displacement; means for supplying a decremental signal determined initially by the rate of change of said displacement; and means modifying the controlling means in accordance with said decremental signal.

5. In combination: means for giving an output signal having a component determined by the displacement of a craft from a predetermnied course; means for giving a decremental signal determined initially by the rate of movement of the craft with respect to the course; and means combining said signals to give a control output.

6. In combination: means for giving an output signal having a component determined by the displacement of a craft from a predetermined path; means for giving a decremental signal determined initially by the rate of movement of the craft with respect to the path; and means combining said signals to give a control output.

7. In combination: means for giving an output signal having a component determined by the displacement of a craft from a predetermined course; means for giving a decremental signal determined initially by the rate of movement of the craft with respect to the course; and means for controlling the craft in accordance with said signals.

8. In combination: means for giving an output voltage having a component determined by the displacement of a craft from a predetermined course; a capacitor; a source of voltage determined at least in part by the rate of movement of the craft with respect to the course; and switching means operable between a first position, in which said capacitor is charged to the voltage of said source, and a second position, in which said capacitor is disconnected from said source and connected to the first named means to transiently modify said output voltage.

9. In combination: means for giving an output voltage having a component determined by the displacement of a craft from a predetermined course; a capacitor; a source of voltage determined at least in part by the rate of movement of the craft relative to the course; switching means operable between a first position in which said capacitor is charged to the voltage of said source, and a second position, in which said capacitor is disconnected from said source and connected to the first named means to transiently modify said output voltage; and means controlling the craft in accordance with said modified voltage.

References Cited in the file of this patent

UNITED STATES PATENTS

| | | |
|---|---|---|
| 2,115,498 | Rieper | Apr. 26, 1938 |
| 2,551,964 | Norton | May 8, 1951 |
| 2,759,137 | Kutzler | Aug. 14, 1956 |
| 2,808,999 | Chenery | Oct. 8, 1957 |
| 2,822,978 | Donovan | Feb. 11, 1958 |